US012223738B2

(12) United States Patent
Marin et al.

(10) Patent No.: US 12,223,738 B2
(45) Date of Patent: Feb. 11, 2025

(54) MACHINE-LEARNED EXPLAINABLE OBJECT DETECTION SYSTEM AND METHOD

(71) Applicant: Hitachi Rail GTS Canada Inc., Toronto (CA)

(72) Inventors: Veronica Marin, Toronto (CA); Evgeny Nuger, Toronto (CA); Jaewook Jung, Toronto (CA); William Wang, Toronto (CA); David Beach, Toronto (CA)

(73) Assignee: Hitachi Rail GTS Canada Inc., Toronto (CA)

( * ) Notice: Subject to any disclaimer, the term of this patent is extended or adjusted under 35 U.S.C. 154(b) by 484 days.

(21) Appl. No.: 17/590,264

(22) Filed: Feb. 1, 2022

(65) Prior Publication Data

US 2022/0245949 A1    Aug. 4, 2022

Related U.S. Application Data

(60) Provisional application No. 63/144,251, filed on Feb. 1, 2021.

(51) Int. Cl.
*G06V 20/58* (2022.01)
*G06V 10/25* (2022.01)
*G06V 10/82* (2022.01)

(52) U.S. Cl.
CPC .............. *G06V 20/58* (2022.01); *G06V 10/25* (2022.01); *G06V 10/82* (2022.01)

(58) Field of Classification Search
CPC ...... G06V 20/582; G06V 10/44; G06V 10/82; G06V 20/58; G06V 10/25; G06V 10/60
See application file for complete search history.

(56) References Cited

U.S. PATENT DOCUMENTS 9,387,867 B2    7/2016  Ignatius et al.
10,037,471 B2   7/2018  Satzoda et al.
(Continued)

FOREIGN PATENT DOCUMENTS

EP    3392797 A1    10/2018
WO    2020026115 A1  2/2020

OTHER PUBLICATIONS

International Search Report and Written Opinion issued in corresponding International Application No. PCT/IB2022/050875, dated May 16, 2022, pp. 1-12, Canadian Intellectual Property Office, Quebec, Canada.
(Continued)

*Primary Examiner* — CongVan Tran
(74) *Attorney, Agent, or Firm* — Studebaker & Brackett PC

(57) ABSTRACT

A method of detecting a way-side object includes receiving data frames from sensors mounted on a vehicle. Position data corresponding to the position of the vehicle is received. Object-of-interest data is retrieved from a database. The sensor data frames and the object-of-interest data are processed to determine a region-of-interest in the sensor data frame. A portion of the sensor data frames corresponding to the region of interest is processed using machine-learned object detection to identify a first object-of-interest. The portion of the sensor data frames corresponding to the region of interest is processed using computer vision methods to detect features of the expected object-of-interest and identifying the detected object-of-interest as explained when the features of the expected object-of-interest are detected. Explained object-of-interest data corresponding to the explained detected object-of-interest is output to a navigation system of the vehicle.

20 Claims, 6 Drawing Sheets

(56) References Cited

U.S. PATENT DOCUMENTS

| | | | |
|---|---|---|---|
| 10,055,850 | B2 | 8/2018 | Piekniewski et al. |
| 10,179,597 | B2 | 1/2019 | Wade |
| 10,430,953 | B2 | 10/2019 | Roshtkhari Javan et al. |
| 10,451,712 | B1 | 10/2019 | Madhow et al. |
| 10,710,621 | B2 | 7/2020 | Betis et al. |
| 10,740,654 | B2 | 8/2020 | Habibian et al. |
| 10,761,538 | B2 | 9/2020 | Ball et al. |
| 10,829,135 | B2 | 11/2020 | Anderson et al. |
| 11,335,036 | B2 * | 5/2022 | Kitamura ............... H04N 23/90 |
| 11,608,097 | B2 * | 3/2023 | Green ..................... G01P 3/68 |
| 2011/0234749 | A1 * | 9/2011 | Alon ..................... G07C 5/0866 348/148 |
| 2018/0307921 | A1 * | 10/2018 | Vallespi-Gonzalez ..................... G01S 17/66 |
| 2019/0051191 | A1 * | 2/2019 | Mosher ................. G06F 18/251 |
| 2019/0095725 | A1 | 3/2019 | Kalghatgi et al. |
| 2019/0213406 | A1 * | 7/2019 | Porikli ................. G06V 20/597 |
| 2019/0295003 | A1 * | 9/2019 | Dronen ................ G05D 1/0221 |
| 2020/0114931 | A1 * | 4/2020 | Rao ....................... B60W 40/09 |
| 2020/0126276 | A1 * | 4/2020 | Rakshit .................. G01S 3/802 |
| 2020/0257907 | A1 * | 8/2020 | Kompalli ............... G06V 10/56 |
| 2020/0318989 | A1 * | 10/2020 | Yang .................. G01C 21/3667 |
| 2021/0201070 | A1 * | 7/2021 | Omari ................ G01C 21/3635 |
| 2021/0343022 | A1 * | 11/2021 | Cohen .................. G01S 13/865 |
| 2022/0171026 | A1 * | 6/2022 | Bakish ................. G01S 7/4812 |

OTHER PUBLICATIONS

Tianfu Wu, Xi Song, Towards Interpretable Object Detection by Unfolding Latent Structures, Dec. 31, 2019.

Richard Tomsett, Amy Widdicombe, Tianwei Xing, Supriyo Chakraborty, Simon Julier, Prudhvi Gurram, Raghuveer Rao, Mani Srivastava, Why the failure? how adversarial examples can provide insights for interpretable machine learning, Jul. 10, 2018.

* cited by examiner

MACHINE-LEARNED EXPLAINABLE OBJECT DETECTION SYSTEM AND METHOD

CROSS-REFERENCE TO RELATED APPLICATIONS

This disclosure claims the priority of U.S. Provisional Application No. 63/144,251, filed Feb. 1, 2021, which is incorporated herein by reference in its entirety.

BACKGROUND

A rail vehicle traveling along a rail track obtains information about the surrounding environment through a combination of vehicle mounted sensors. Object detection systems process the sensor data and output object detection data corresponding to detected wayside objects. When the detection of wayside objects is being used to control the rail vehicle, the object detection system is required to be safety-critical, designed to meet strict safety requirements. A safety-critical system is a system whose failure or malfunction may result in death or serious injury to people, loss or severe damage to equipment/property or environmental harm.

A safety-critical object detection system requires that the object detections be explainable in human understandable terms, allowing humans to review the object detection system's process, to identify instances of misidentification of objects, non-detection of known objects and other sources of failure. This requirement has been an obstacle to designing safety-critical neural network object detection systems because when object detections are made using neural network object detection, the reasons underlying the object detections are unexplainable in human-understandable terms.

DETAILED DESCRIPTION

Figure 1:
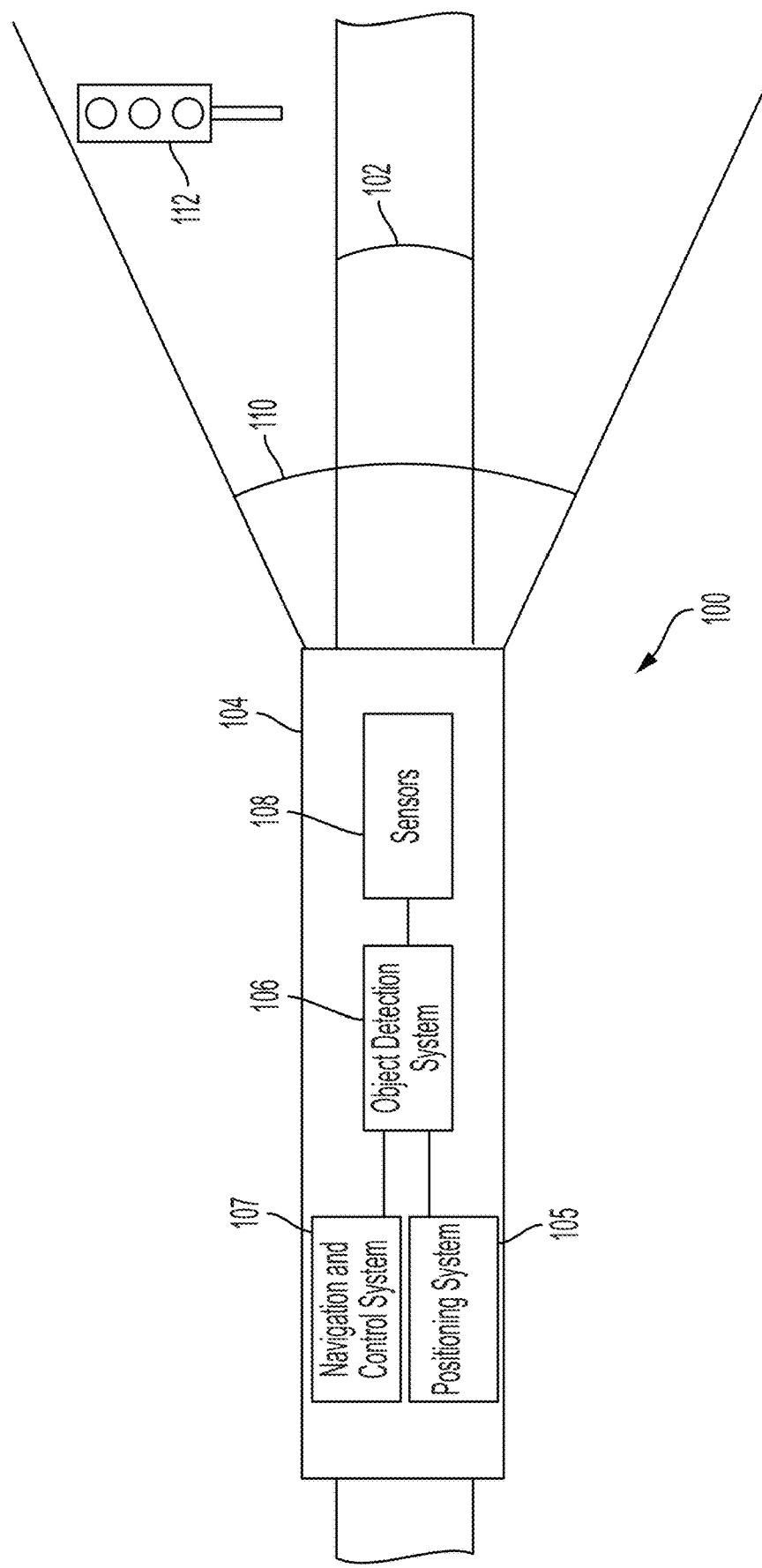
FIG. 1 is a top view of an object detection system implementation, in accordance with some embodiments.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top-view of an object detection system implementation 100, in accordance with an embodiment. A vehicle 104, moving along a constrained path 102 (also referred to as a rail track, guideway or portion of a guideway) on a transportation network, navigates to a destination with a positioning system 105 and a navigation and control system 107. To safely navigate, the navigation and control system 107 receive information from an object detection system 106 about objects-of-interest (OOI) 112 detected in data frames collected by vehicle-mounted sensors 108 having a field-of-view (FOV) 110. Because object detection is a safety-critical application, the object detection system is required to reliably provide explainable detections of railside OOI, e.g., objects commonly placed or found along the rail track and the rail track's surroundings. The positioning system 105 is optional in systems that are not safety critical, i.e., for systems operating with no positioning information that are monitoring explainable OOI detections.

A safety-critical application is an application whose failure or malfunction may result in death or serious injury to people, loss or severe damage to equipment/property or environmental harm. A safety-critical application or system is rated Safety Integrity Level (SIL) 4. For a system to be rated as SIL 4, the system is required to have demonstrable on-demand reliability, and techniques and measurements to detect and react to failures that may compromise the system's safety properties. SIL 4 is based on International Electrotechnical Commission's (IEC) standard IEC 61508 and EN standards 50126 and 50129. SIL 4 requires the probability of failure per hour to range from $10^{-8}$ to $10^{-9}$. Safety systems that are not required to meet a safety integrity level standard are referred to as non SIL.

In some embodiments, the vehicle 104 is a train, a monorail, a magnetic guided vehicle, a car or other automotive vehicle, a railcar, a watercraft, an aerospace vehicle, a rover, a drone or other suitable vehicle. In some embodiments, vehicle 104 is a machine that transports people and/or cargo. In some embodiments, vehicle 104 includes wagons, bicycles, motor vehicles (motorcycles, cars, trucks, and buses), railed vehicles (trains, trams), watercraft (ships, boats), amphibious vehicles (screw-propelled vehicle, hovercraft), aircraft (airplanes, helicopters) and spacecraft. Land vehicles are classified broadly by what is used to apply steering and drive forces against the ground: wheeled, tracked, railed or skied, such as is detailed in ISO 3833-1977 standard. Vehicle 104 is restricted to a constrained path, such as constrained path 102. In some embodiments, vehicle 104 is an autonomous vehicle. Autonomous vehicles use mechatronics, artificial intelligence, and/or multi-agent systems to assist a vehicle's operator.

In some embodiments, a constrained path 102 is a track, rail, roadway, cable, series of reflectors, series of signs, a visible or invisible path, a projected path, a laser-guided path, a global positioning system (GPS)-directed path, an object-studded path or other suitable format of guide, path, track, road or the like on which, over which, below which, beside which, or along which a vehicle is caused to travel. The constrained path 102 may be train tracks, although it could be other forms of guideway such as rails, concrete viaduct, monorails, or roads with all changes in lane or track limited to fixed locations referred to as switches.

Constrained path 102 is a track on a railway or railroad, further known as a permanent way (e.g., a constrained path). Constrained path 102 is the structure consisting of the rails, fasteners, railroad ties and ballast (or slab track), plus the underlying subgrade. The constrained path enables trains to move by providing a dependable surface for their wheels to roll upon. For clarity, constrained paths are referred to as railway tracks, railroad track or a guideway. However, constrained paths are not restricted to railways and in some embodiments, constrained paths further include any autonomous vehicle that is limited to a predetermined or prepogramed route (e.g., self-driving car or truck moving along an inputted or predetermined route).

Rail-side OOI 112 include, for example, railway signals, signs, level crossings, rail switches, natural landmarks, loading/off-loading platforms and other appropriate objects.

In the present disclosure, a data frame refers to a set of data and/or metadata outputted by a vehicle mounted sensor 108 at a given instant in time. A data frame is the output of measurement and processing operations executed by the vehicle mounted sensor 108 during a time period preceding that instant. For example, a single camera image, or a single LiDAR point cloud, are considered a single data frame.

Object detection is a computer image processing technique that identifies and locate objects in a data frame. Object detection is used to recognize OOI 112 in a scene and determine and track the precise locations of the OOI 112 and accurately label the type of OOI 112.

Figure 2:
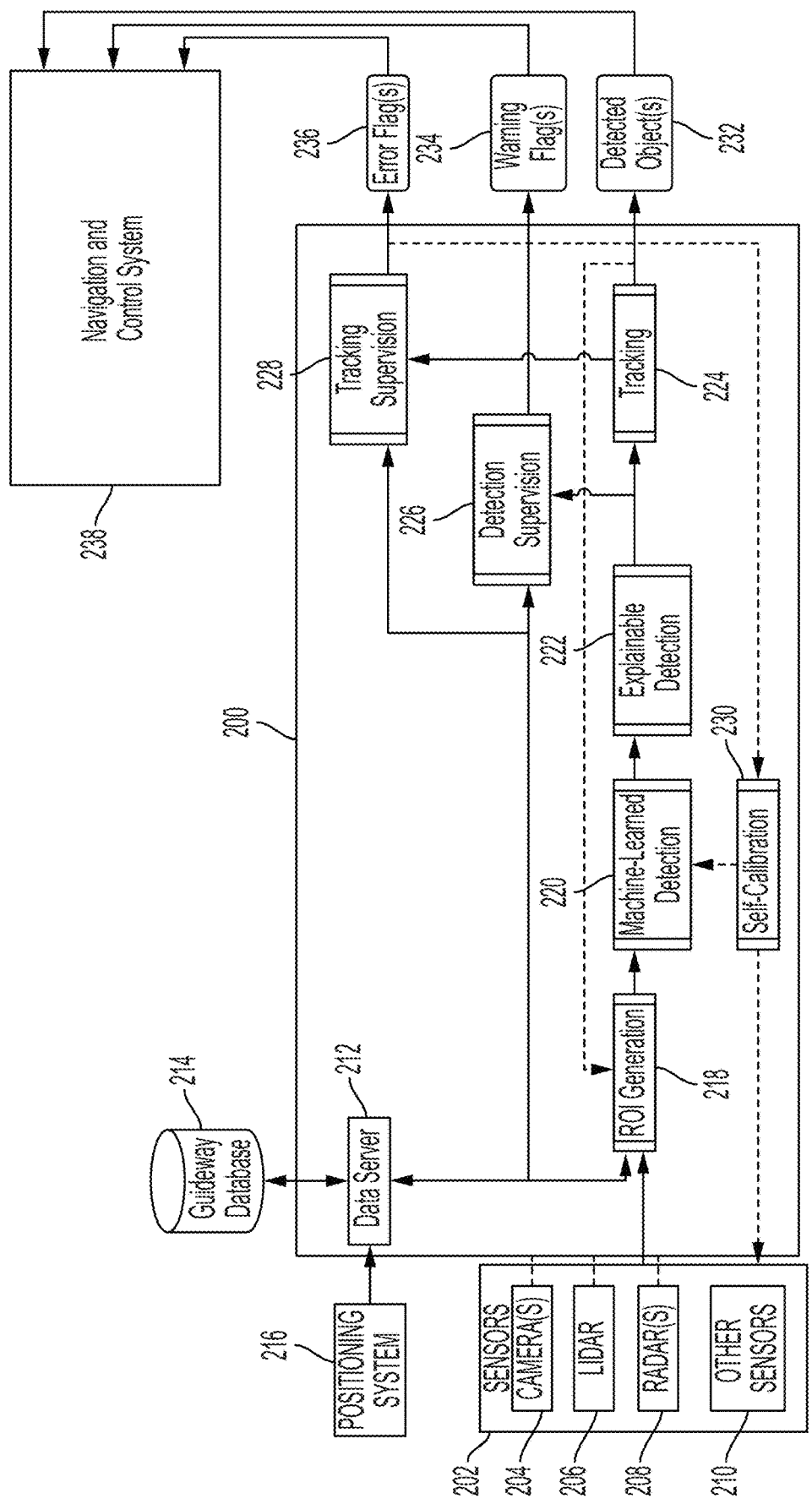
FIG. 2 is a block-diagram of an object detection system, in accordance with an embodiment.

FIG. 2 is a block diagram of an object detection system 200 (for example, an embodiment of objection detection system 106 (FIG. 1)), in accordance with an embodiment. The object detection system 200 is connected to vehicle mounted sensors 202 (for example, embodiments of sensors 108). The vehicle mounted sensors 202 include a camera (or cameras) 204, a LIDAR sensor (or sensors) 206, a RADAR (or RADARs) 208 and/or other sensor systems and devices 210. The object detection system 200 receives a sequence of data frames from the vehicle mounted sensors 202.

The object detection system 200 is connected to a positioning system 216 and a guideway database 214. The object detection system 200 is connected to navigation and control system 238 (for example, an embodiment of navigation and control system 107 (FIG. 1)). In accordance with various embodiments, navigation and control system 238 includes displays, vehicle control systems, navigation systems or other processing and control systems. The navigation and control system 238 includes subsystems such as automatic train protection (ATP) or automatic train operation (ATO) (not shown). The navigation and control system 238 receives data from the object detection system 200 including data representing detected objects 232, warning flags 234 and error flags 236.

The object detection system 200 includes a data server 212, a Region of Interest (ROI) generation module 218, machine learned detection module 220, explainable detection module 222, tracking module 224, detection supervision module 226, tracking supervision module 228 and self-calibration module 230.

In accordance with an embodiment, the object detection system 200 sends a request to the vehicle mounted sensors 202 as a prompt for each of the vehicle mounted sensors 202 to provide a data frame corresponding to a determined instant in time. In response, the vehicle mounted sensors 202 output data frames that all correspond to the same, determined instant in time, to the object detection system 200. Data frames typically include time stamp data or other time-dependent data to preserve the data frame's association with the determined instant in time.

In accordance with another embodiment, the vehicle mounted sensors 202 transmit a constant or periodic output of data frames to the object detection system 200. The object detection system 200 records the time of receipt of the data frames. In some embodiments, the vehicle mounted sensors 202 transmit a constant or periodic output of time-stamped data frames to the object detection system 200.

The vehicle-mounted sensors 202, in accordance with some embodiments, include cameras 204 operating on the visible light spectrum. Multiple cameras 204 are provided to enable visible light 3D vision or stereo processing, in accordance with some embodiments. In accordance with some embodiments, cameras 204 are used with active illumination devices, to provide structured-light for the camera and improve the quality of the data frames.

The vehicle-mounted sensors 202, in accordance with some embodiments, include cameras 204 operating on invisible light spectra, such as infrared or ultraviolet. In accordance with some embodiments, multiple invisible light cameras 204 are provided to enable invisible light 3D vision or stereo processing. In accordance with some embodiments, invisible light cameras 204 are used with active invisible light illumination devices, to provide structured-light for the invisible light cameras 204 and improve the quality of the data frames.

The vehicle-mounted sensors 202, in accordance with some embodiments, include RADAR 208. The vehicle-mounted sensors 202, in accordance with some embodiments, include LiDAR sensors 206. The vehicle-mounted sensors 202, in accordance with some embodiments, include other appropriate sensors 210, such as ultrasonic sensors.

In accordance with an embodiment, the object detection system 200 inputs are connected to four vehicle mounted sensors 202, for example, two color cameras 204 operating on the visible spectrum, LiDAR sensor 206 and RADAR 208. This object detection system 200 communicates through a data server 212 with a guideway database 214 that contains the position information about the OOI and associated metadata. The vehicle mounted sensors 202 are synchronized, triggered by the object detection system 200, such that all sensor data frames correspond to the same instant in time. The machine-learned detection module 220 is implemented with deep neural network architectures for object detection, e.g., Mask R-CNN with a ResNet-50 backend.

The object detection system 200 includes a data server 212. The data server 212 receives requests for data from and provides data to the ROI generation module 218, detection supervision module 226 and tracking supervision module 228. The data server 212 receives data provided by the ROI generation module 218, detection supervision module 226 and tracking supervision module 228. The data server 212 is connected to and receives data from a guideway database 214 and a positioning system 216. The guideway database 214 stores information about OOI that have been placed, identified or located on, near or along a rail track 102. The guideway database 214 contains information about the position of the OOI (OOI POS), OOI type (OOI TYPE) and a three-dimensional bounding box containing the OOI (OOI BBOX). The guideway database 214, in accordance with some embodiments, includes metadata regarding the OOI such as labels for each face of the OOI BBOX as corresponding to the front/rear/top/bottom/left/right sides of the OOI BBOX.

A bounding box (OOI BBOX) is an imaginary rectangle that serves as a point of reference for object detection and creates a collision box for that object. Object detection systems 200 draw bounding box rectangles over images, outlining the OOI within each data frame by defining its X and Y coordinates.

The guideway database 214 contains information OOI POS about the position of known OOI along the rail track 102. The guideway database 214 stores historical raw sensor data recorded by multiple sensors in a variety of environmental conditions, indexed by position of the OOI along the rail track 102. The guideway database 214 stores previous object detections along with the set of data frames upon which the detections were based, indexed by position along the rail track 102.

The data server 214 is connected to the positioning system 216. The positioning system 216 provides real-time position information about the rail vehicle 104. In accordance with an embodiment, the rail vehicle positioning system 216 provides the uncertainty/expected error of the position information.

Positioning includes determining the location of the vehicle's reference point, a predefined point on the vehicle, in a particular geo-spatial coordinate system, e.g., on a map. The positioning of a rail vehicle on the map of a guideway is determined by global positioning system (GPS) signals. Other positioning systems are usable in conjunction with an embodiment. In other embodiments, if the vehicle is manually operated, the positioning is based on signals controlled by an interlocking system and the vehicle's position on the guideway is determined based upon track circuits and/or axle counting blocks occupancy. In other embodiments, if the vehicle is communication-based train control (CBTC) equipped, the vehicle's position on the guideway is initialized based on a radio-frequency identification (RFID) transponder reader installed on the vehicle and a corresponding transponder tag installed on the track bed. Then, the vehicle's position on the guideway is updated based on distance travelled and direction determined based on axle/wheel mounted tachometer or speed sensor measurements.

In accordance with some embodiments, the specific safety level is determined based on the failure rate of the detections during a calibration run, with known position, but during use doesn't need position.

As the data frames are received from the vehicle mounted sensors 202, the data server 212 requests the list of OOI and their properties/metadata (OOI POS, OOI TYPE, OOI BBOX, etc.) corresponding to the current position of the rail vehicle 104 along the rail track 102. The data server 212 retrieves the requested data from the guideway database 214 and rail vehicle positioning system 216. As the train moves along the track, encountering OOI, the sensors 202 generate a constant stream of data frames. The data server 212 receives a constant stream of positioning data and returns the list of OOI that are within sensors 202 FOV based on current position considering uncertainty. The list of OOI is empty if there are no objects around the current position. The ROI generation module 218 generates ROI when receiving a non-empty list of expected OOI objects.

In accordance with various embodiments, the data server 212, guideway database 214 and/or positioning system 216 is located on or within the rail vehicle 104. In accordance with other embodiments, one or more of the data server 212, guideway database 214 and/or positioning system 216, or components thereof are located off-vehicle and accessed remotely, communicating with the object detection system 200 using a suitable communication network.

Each data frame is processed by a region-of-interest (ROI) generation module 218. The ROI generation module generates an ROI mask, i.e., a set of coordinates that define an area of the data frame containing an OOI. The ROI generation module 218 processes the data frame, the list of known OOI, the OOI POS, the OOI TYPE, the OOI BBOX, the OOI metadata, the vehicle position and/or the uncertainty/expected error of the vehicle position. The ROI generation module 218 generates ROI in the data frame by transforming, translating, rotating and/or projecting the known OOI POS and OOI BBOX to the coordinate system in which each data frame is expressed, accounting for the uncertainty in the vehicle position. The region of interest of data frame may consist of the entire frame.

The ROI generation module 218 outputs an ROI mask applied to each sensor data frame, which indicates the portion of each data frame containing a representation of a known OOI. Further processing operations are only applied to the portion of the data frame defined by the ROI mask. By restricting further processing operations to the masked subset of the data frame, the false positive rate is reduced because processing time is not spent analyzing portions of the data frame where OOI are not expected. Similarly, the processing time is reduced because only portions of the data frame that include OOI are processed. This reduction in processing time allows the object detection system 200 to be responsive in real-time operations, regardless of the speed at which the rail vehicle 104 travels along the rail track 102.

The ROI generation module 218 provides the ROI-masked sensor data frames to a machine-learned detection module 220, for example a deep convolutional neural network, for processing.

A deep convolutional neural network is a class of deep neural networks, most commonly applied to analyzing visual imagery. A deep convolutional neural network is a deep learning algorithm that takes in a data frame, assigns importance (learnable weights and biases) to various aspects/objects in the data frame and is able to differentiate one aspect/object from another aspect/object. A deep convolutional neural network captures the spatial and temporal dependencies in a data frame through the application of relevant filters. The deep convolutional neural network architecture performs a better fitting to the data frame due to the reduction in the number of parameters involved and reusability of weights.

In accordance with an embodiment, the machine-learned detection module 220 includes a deep neural network architecture for object detection, e.g., Mask Recurrent Convolutional Neural Network (Mask R-CNN) with a residual neural network (ResNet-50) backend.

Mask R-CNN is a deep convolutional neural network that adds a branch for predicting an object mask in parallel with the existing branch for bounding box recognition.

ResNet-50 is a convolutional neural network that is 50 layers deep.

The machine-learned detection module 220 is trained with a comprehensive data set representative of expected OOI in both expected and especial environmental and operational conditions. The machine-learned detection module 220 receives ROI-masked data frames and detects OOI in each ROI-masked data frames.

The machine-learned detection module 220 identifies OOI in a set of asynchronous sensor data frames using time stamps associated with the data frames to organize the data frames temporally.

For each data frame, the machine-learned detection module 220 outputs a list of OOI that have been detected in the ROI-masked data frames and their bounding boxes.

For each data frame, a list of OOI and their bounding boxes are output to an explainable detection module 222. The explainable detection module 222 implements an array of one or more explainable detectors (not shown). The explainable detectors are based on classical methods of computer image processing that exploit object features to identify OOI. The explainable detection module processes the data frame with the explainable detectors to detect OOI in ways that can be explained to a human reviewing the detection.

A key feature to explainable detectors is that the output of the explainable detection is human-understandable. For example, an edge detector processes a data frame and identifies edges in the frame that are associated with an OOI. The identification of edges is a process that is understood by human intelligence. The identification of edges, combined with other features detected in an explainable manner, is used to detect and label OOI in a way that can be explained.

Some examples of explainable detectors are edge detectors, histograms of oriented gradients, texture filters, non-linear saturation transformations, polynomial fitting of geometric features, Density-Based Spatial Clustering of Applications with Noise (DBSCAN), ground filtering and scale-invariant feature transformers.

Every OOI type has its own special features that help in classifying the type—for example all circles are round. Explainable object detection uses these features to identify the OOI. For example, when looking for circles, objects that are at a particular distance from a point (i.e., the center) are sought. Similarly, when looking for squares, objects that are perpendicular at corners and have equal side lengths are sought.

Figure 3:
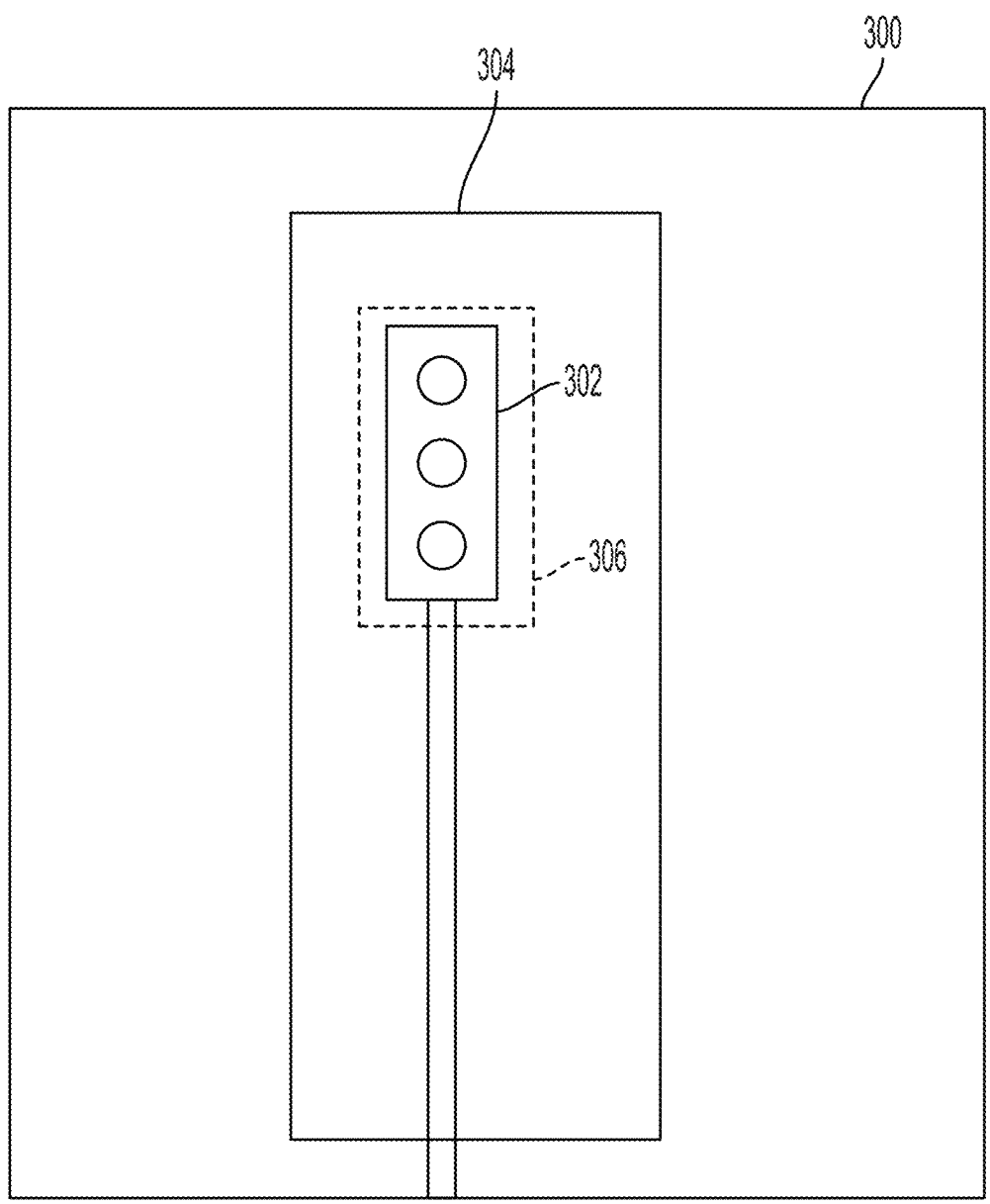
FIG. 3 is a representation of a camera data frame processed for object detection, in accordance with an embodiment.

FIG. 3 is a representation of a camera data frame 300 processed by ROI generation module 218 and machine-learned detection module 220 for object detection, in accordance with an embodiment. A data frame 300 includes an OOI 302, in this case, a railway signal. An ROI mask 304 (the unshaded portion of the data frame), generated by ROI generation module 218, is applied to the data frame 300 so that only the portion of the data frame within the ROI mask (the unshaded portion) is processed further by the machine-learned detection module 220 to define a bounding box 306 around the image of the detected OOI 302.

Figure 4:
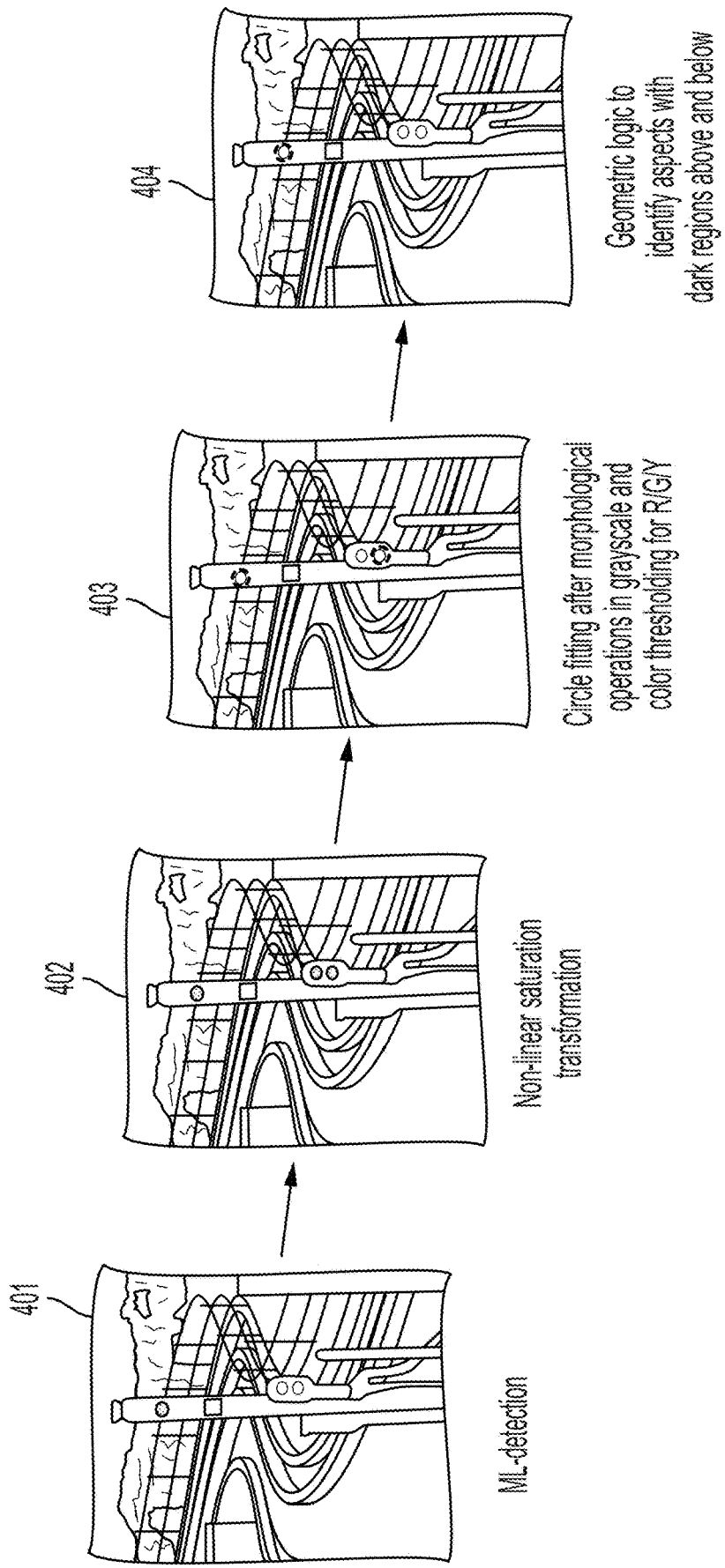
FIG. 4 is an example of explainable detection based on camera images, in accordance with some embodiments.

FIG. 4 is an example of explainable detection based on camera images, e.g., camera data frame 300 (FIG. 3). A data frame 401 has been identified by the machine-learned detection module 220 as including an OOI, a signal in this example, however there is no explanation as to what features led to the machine-learned detection module 220 to that conclusion. To explain the detection, the data frame 401 is processed by the explainable detection module 222 with a non-linear saturation transformation to generate data frame 402, identifying features that appear to be illuminated in the data frame 40, as a signal has brightly lit areas. A circle fitting is performed on data frame 402 (after morphological operations in gray-scale and color thresholding for R/G/Y) to identify circular regions of the data frame 403, as a signal includes circular regions. Finally, geometric logic is used on data frame 403 to generate data frame 404, to identify dark regions above and below lighted regions, as the arrangement of light and dark regions represent possible signal aspects in data frame 404. This sequence of processing steps explainably detects the features of an OOI corresponding to a signal.

Returning to FIG. 2, the explainable detection module 222 uses explainable detectors to identify a vertical or horizontal rectangular object (e.g., based on edge detectors, such as Canny or gradient-thresholding), with three or more circles inside, equidistant from each other, one of which has a color belonging to the set (red, yellow, green), which may be intermittent in time. Another explainable detector detects circular shapes that have the largest image intensities after a non-linear saturation transformation and are surrounded by the darkest regions of the image above and below.

In general, the use of explainable features increases the integrity of the detections, by accepting as positive only those detections that can be explained to a human. The outputs of each of the explainable detectors in the explainable detection module 222 are combined by a composition of one or more logical operations (e.g., AND, OR, NOT). For example, the system can combine two explainable detectors in sequence (an AND operation) or combine them as parallel operations that result in a positive detection if any or both of these detectors output a positive detection (an OR operation). More complex serial and parallel combinations of these logical operations allow the high-integrity detection of a wide array of objects.

In accordance with other embodiments, the explainable detection module 222 combines human-understandable features detected by the explainable detectors into a single detection response based on Decision Trees or similar methods which infer human-understandable decision rules from training data.

The object detection system 200 combines a machine-learning detector 220 with an explainable detector module 222. The explainable detector module 222 generates detected explainable object features and includes complex serial and/or parallel compositions of logical operations, geometric arguments and spatial reasoning about the detected, explainable object features, to verify that an object detected by the machine-learned object detector is indeed the expected object, and that this detection can be explained in human-understandable terms.

The explainable detection module 222 uses a different set of operations for each vehicle mounted sensor 202. For the camera data frames, the explainable detectors include, for example, a Canny edge detector, non-linear saturation transformations, polynomial fitting of geometric features (e.g., circles) and geometric logic arguments about object features and their spatial relationship with their surroundings. A Density-Based Spatial Clustering of Applications with Noise (DBSCAN) clustering method is used on the space of target reflectivity, reflection strength, and spatial position to assign targets to individual objects based on their similarity in these metrics for RADAR data frames. For LiDAR data frames, a series of explainable operations are used, for example, ground filtering, DBSCAN clustering to identify segments of the point cloud that are likely to belong to the same object, feature detection (edges, corners, planes, roughness, among others). Similar operations are applied to a 3D point cloud obtained by combining images from the two cameras 204 using stereo vision methods.

The output of these explainable operations on the camera data frames, RADAR data frames and LiDAR data frames, are combined with an AND operation to define a feature vector that is then used to make a detection decision and object classification, based on known, human-understandable features of the OOI in the database.

Explainability allows the object detection system 200 to be certified for safety, as the object detection decisions are recorded by the detection supervision module 226 and can be explained, audited, and the probabilities for correct and erroneous detection decisions can be reasonably estimated.

A detection supervision module 226 compares the outputs of the explainable detection module 222, the vehicle position and the OOI data from the guideway database via data server 212 and outputs a WARNING FLAG 234 whenever the OOI detections by the machine-learned detection module 220 are not detected by the explainable detection module 222 and so are not explainable and/or when objects that are known to be observable/detectable at the current vehicle position in the OOI list received from the guideway database 214 are in fact not detected by the machine-learned detection module 220. A WARNING FLAG 234 indicates abnormal events such as: "Expected object type(s) NOT detected," "No objects detected," or the like. The object detection system 200 outputs data representing detected objects 232 including explainable detected OOI and their bounding boxes to the navigation and control system 238. The detected objects 232 includes detected OOI for which the detection can be explained, along with their positions, bounding boxes and/or metadata.

A tracking module 224 receives a list of explainable detected objects from the explainable detection module 222. The tracking module 224 implements a buffer of a given size N that retains a recent history of detected OOI, their positions and/or other metadata for the last N sensor data frames. N is an integer greater than or equal to one.

Tracking module 224 uses a motion model to determine the continuity and persistence of the detected OOI. The motion model determines changes between data frames that would be consistent with an identified OOI. Applying a motion model for the OOI, a motion model for the rail vehicle 504, and a pre-defined tracking policy, the tracking module 224 validates the object detections from the explainable detection module, confirming only as positive detections those objects that have been detected in several (or all, depending on the tracking policy) of the buffer frames, and also satisfy the constraints imposed by the motion models, i.e., that comply with physical laws governing motion and performance limits (e.g., maximum acceleration, maximum speed, expected trajectory inferred from the rail track geometry). The output of the tracking module 224 is a list of positively detected OOI, the OOI properties and/or metadata, and a confidence measure (e.g., expressed as a probability or within another form) for the OOI presence at the detected location. This list of positively detected OOI, including their properties, metadata and confidence level for their detection, is output by the tracking module 224 to other rail vehicle systems, e.g., to influence driving, control and navigation decisions.

The tracking module 224 uses a buffer that stores a number frames that depends on the current vehicle speed, for example, the last ten object detection results. An Extended Kalman Filter (EKF) is used with the motion model of the rail vehicle dynamics for detection of stationary objects to predict where the object will be in the next frame in the buffer. This prediction is compared with the object detection using the EKF innovation test, and if the EKF innovation test is successful, the object is confirmed as detected at the corresponding position. Successive failures in the EKF innovation tests will lead the tracking supervision module 228 to output an ERROR FLAG 236 to the navigation and control system 238.

The EKF innovation test is defined as the difference between a measured observation and a prediction made using the information available at time. The EKF innovation test is passed if the measure of the new information provided by adding another measurement in the estimation process is positive or above a threshold.

The operations in the tracking module 224 are also explainable, as they are based on motion models for the OOI to be detected. These motion models, and the current rail vehicle speed, place a constraint on the difference in position of the detected OOI between two successive frames in the buffer, and allows the tracking module 224 to associate these detections as corresponding to the same object or to different objects.

A tracking supervision module 228 receives the list of positively detected OOI and confidence measures from the tracking module 224. The tracking supervision module 228 sends a request to the data server for the current position of the rail vehicle and list of OOI, OOI properties and metadata for comparison. The tracking supervision module 228 outputs an ERROR FLAG 236 to the navigation and control system 238 when OOI that are known to be observable/detectable from the current position of the rail vehicle 104 have not been detected for a certain number (or all, depending on tracking policy) of the buffer frames in a row. This is an indication that the object detection system 200 has failed to reliably detect expected OOI, has been unable to explain these detections, and/or such detections have not occurred a sufficient number of times in a time period preceding the current instant in time. The ERROR FLAG 236 is output to the navigation and control system 238 for appropriate response such as emergency-brake command, speed reduction, or enlarged moving authority, among others.

In accordance with an embodiment, the list of OOI, OOI properties and metadata outputted by the tracking module 224 are transmitted to the ROI detection module 218 and are compared with the rail vehicle position information and list of OOI obtained from the data server 212. Mitigation actions are performed to reduce the uncertainty of the rail vehicle position information, thus improving the accuracy of the ROIs that are passed along to the machine-learned detection module 220.

In accordance with an embodiment, a self-calibration module 230 receives the output of the tracking supervision module 228, including vehicle position and OOI information that the tracking supervision module 228 obtained from the data server 212, and uses differences between the detections and expected detections to implement appropriate sensor calibration actions, such as modifying optical parameters for cameras, operating mode and thresholds for RADAR or LiDAR, or the like.

The self-calibration module 230 determines appropriate machine-learned detection calibration actions such as modifying classification thresholds, color space transformations, brightness/contrast/sharpness corrections. The calibrations are made to maximize the ability of the system to detect a set of special calibration objects, placed at different positions along the rail track 102, which are known to be observable/detectable from a given rail vehicle position. This self-calibration functionality allows the system to adapt to environmental and operational conditions that may affect the sensor measurements or generally degrade the detection performance such as low visibility due to weather conditions. Thus, the distance between the calibration objects may be determined by the timescale of potential changes in environmental and operational conditions, and the average speed of the rail vehicle 104 along the rail track 102. In accordance with an embodiment, a calibration object is located at the starting point of each rail vehicle trip, such as at the exit of a loading/off-loading platform, at rail switches, or in the yards. The calibration object is detected by the object detection system 200 and the self-calibration module 230 uses the detection to calibrate the vehicle mounted sensors 202.

The self-calibration module 230 modifies optical camera parameters such as aperture, shutter speed and focal length, and neural-network detection/classification probability thresholds that impact the ability to detect objects in the camera data frames.

The object detection system 200 maintains a recent history of recent object detection decisions and associated data frames and implements tracking policies to further verify that the detections are valid, by ensuring that only those objects that are persistently detected in successive data frames are considered valid and passed along as the output of the object detection system 200.

In accordance with an embodiment, the object detection system 200 dynamically augments the guideway database 214 by storing all successful object detections and the data frames associated with the detection, including the tracking buffer. The stored detections and data frames, including the tracking buffer, are provided to an outlier detection module (not shown) that pre-processes data frames and removes data frames that do not contain OOI before outputting the data frames to the ROI generation module 218. Data-compression and data-pruning operations keep the guideway database 214 at a manageable size, by keeping only a representative set of sensor data frames for each object detection, i.e., discarding this information when a new detection is similar to other entries in the guideway database 214.

The object detection system 200 uses high-density multi-sensor surveys of the train guideway and its surroundings, indexed by position along the rail track 102, to further improve the integrity of the object detection system 200 by using stored raw sensor data for real-time diagnostics and failure detection. The object detection system 200 detects anomalies in the infrastructure (e.g., sabotage, malfunctioning signal systems, extreme weather events, intrusions), as each rail vehicle 104 is in effect doing an inspection as they travel along the rail track 102.

In accordance with various embodiments, the object detection system 200 is used in driving assistance systems or obstacle detection systems for vehicles or robots travelling along a known, fixed route.

Figure 5:
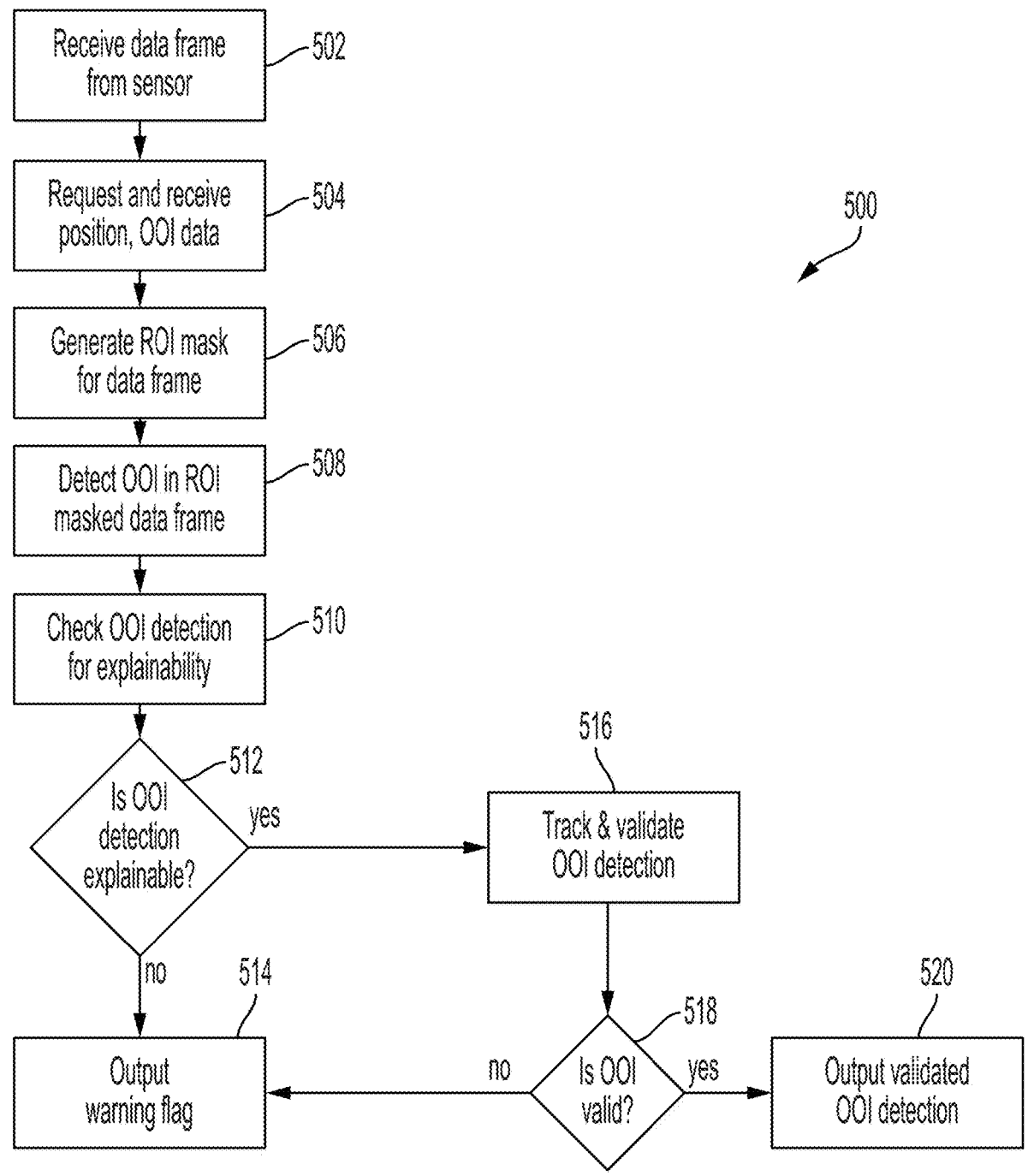
FIG. 5 is a flowchart of an object detection method, in accordance with some embodiments.

FIG. 5 is a flowchart of an object detection method 500, in accordance with an embodiment. In at least some embodiments, object detection processing system 600 executes object detection method 500. The object detection system 200 receives a data frame from a vehicle mounted sensor 202 at operation 502. The object detection system 200 receives vehicle position data and known OOI data from the guideway database 214 at operation 504. Using the data frames, vehicle position data and known OOI data, an ROI mask for each data frame is generated by ROI generation module 218 at operation 506. A machine-learned detection module 220 detects machine-learned OOI in the ROI masked data frames at operation 508.

Explainable detectors 222 process the ROI masked data frames and known OOI data to provide identifications of image features to identify explainable OOI in the ROI masked data frames at operation 510. The machine-learned OOI detection is compared to the explainable OOI and the expected OOI at the vehicle position at operation 512. If the machine-learned OOI detection does not match the explainable OOI and the expected OOI in operation 510, a warning flag is output to the navigation and control system 238. When the machine-learned OOI detection matches the explainable OOI and the expected OOI, the accepted machine-learned OOI are tracked through a sequence of data frames at operation 516. Validation of the OOI is checked at operation 518. If an accepted machine-learned OOI is detected in the sequence of data frames, or a threshold percentage of the sequence of data frames, the machine-learned OOI detection is validated and output to the navigation and control system 238 at operation 520. If the accepted machine-learned OOI is not detected in a sequence of data frame or a threshold percentage of the sequence of data frames, the accepted machine-learned OOI is not validated and a warning flag is output to navigation and control system 238 at operation 514.

Figure 6:
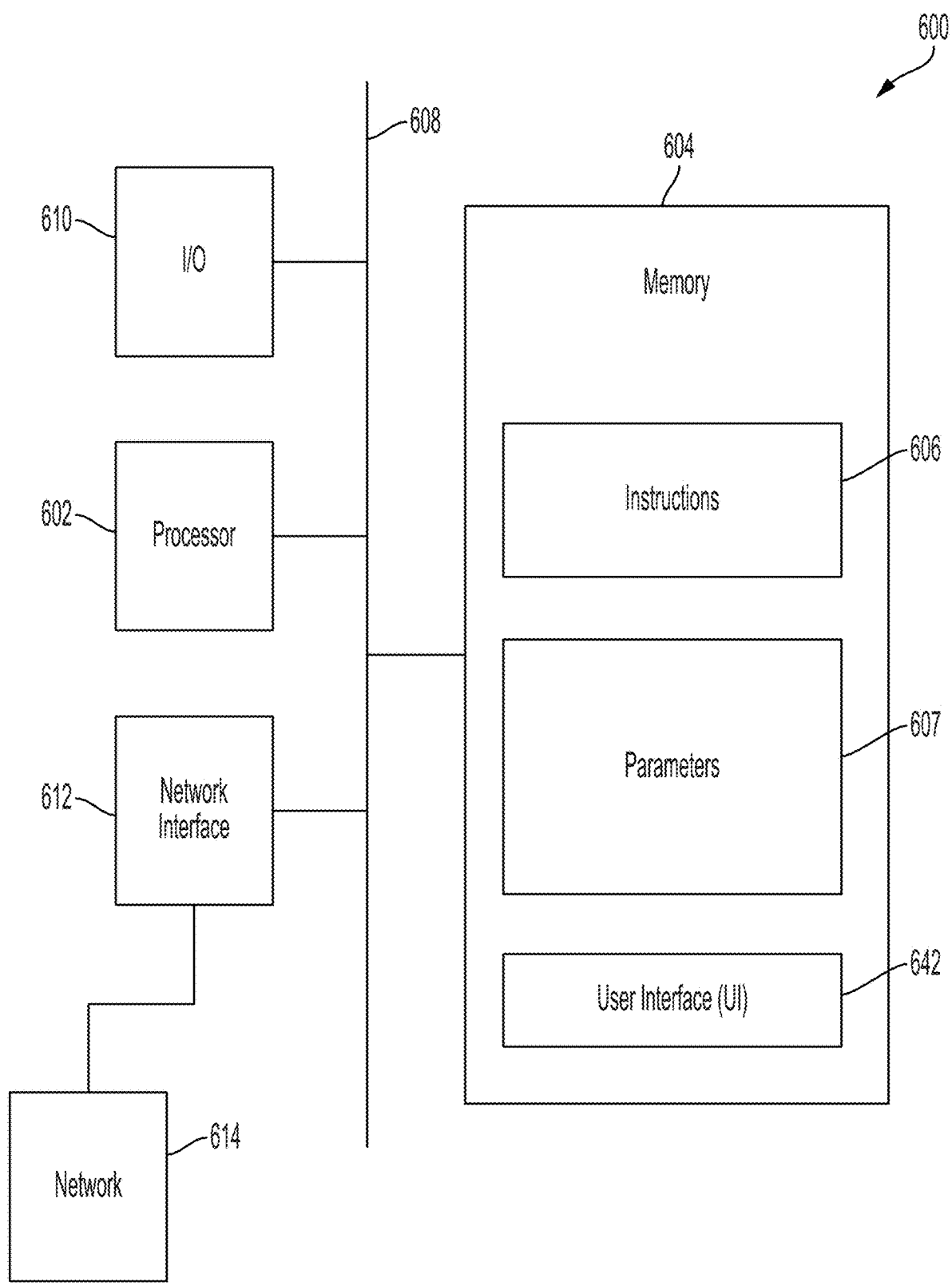
FIG. 6 is a high-level block diagram of a processor-based system usable in conjunction with one or more embodiments.

FIG. 6 is a block diagram of an object detection processing system 600 in accordance with some embodiments.

In some embodiments, object detection processing system 200 is implemented using a general purpose computing device 600 including a hardware processor 602 and a non-transitory, computer-readable storage medium 604. Storage medium 604, amongst other things, is encoded with, i.e., stores, computer program code 606, i.e., a set of executable instructions. Execution of instructions 606 by hardware processor 602 represents (at least in part) an object detection processing tool which implements a portion or all of the methods described herein in accordance with one or more embodiments (hereinafter, the noted processes and/or methods).

Processor 602 is electrically coupled to computer-readable storage medium 604 via a bus 608. Processor 602 is also electrically coupled to an I/O interface 610 by bus 608. A network interface 612 is also electrically connected to processor 602 via bus 608. Network interface 612 is connected to a network 614, so that processor 602 and computer-readable storage medium 604 are capable of connecting to external elements via network 614. Processor 602 is configured to execute computer program code 606 encoded in computer-readable storage medium 604 in order to cause system 600 to be usable for performing a portion or all of the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program code 606 configured to cause system 600 to be usable for performing a portion or all of the noted processes and/or methods. In one or more embodiments, storage medium 604 also stores information which facilitates performing a portion or all of the noted processes and/or methods. In one or more embodiments, storage medium 604 stores parameters 607.

Object detection processing system 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Object detection processing system 600 also includes network interface 612 coupled to processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-1564. In one or more embodiments, a portion or all of noted processes and/or methods, is implemented in two or more systems 600.

Object detection processing system 600 is configured to receive information through I/O interface 610. The information received through I/O interface 610 includes one or more of instructions, data, and/or other parameters for processing by processor 602. The information is transferred to processor 602 via bus 608. Object detection processing system 600 is configured to receive information related to a UI through I/O interface 610. The information is stored in computer-readable medium 604 as user interface (UI) 642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

A method of detecting a way-side object includes receiving sensor data frames corresponding to a first time from sensors mounted on a vehicle and receiving position data corresponding to a first position of the vehicle at the first time. Object-of-interest data is retrieved from a database, where the object-of-interest data corresponds to an expected object-of-interest detectable by the sensors at the first position of the vehicle. The sensor data frames and the object-of-interest data are processed to determine a region-of-interest in at least one frame of the sensor data frames. A portion of the sensor data frames corresponding to the region of interest are processed using machine-learned object detection to identify a first object-of-interest. The portion of the sensor data frames corresponding to the region of interest are processed using computer vision methods to detect features of the expected object-of-interest and identifying the detected object-of-interest as explained when the features of the expected object-of-interest are detected. Explained object-of-interest data corresponding to the explained detected object-of-interest are output to a navigation system of the vehicle.

The method includes receiving and processing sensor data frames corresponding to a series of times to generate a series of explained object-of-interest data. The series of explained object-of-interest is compared to validate the explained object-of-interest. The machine-learned object detection is a deep convolutional neural network. The method includes comparing the validated explained object-of-interest with expected object-of-interest data to identify detection failures. The computer vision methods include edge detection. Detection failures are used, in accordance with some embodiments, to identify a safety level.

An explained machine learning object detection system includes an input module connected to sensors and a data server. The input module receives data frames from the sensors corresponding to a first time. The input module receives data corresponding to the sensors position and objects-of-interest detectable from the sensors position. A region-of-interest module is connected to the input module. The region-of-interest module determines, using object-of-interest data, regions-of-interest of the data frames. A machine-learned object detection module is connected to the region-of-interest module. The machine-learned object detection module uses the regions-of-interest of the data frames to detect objects in the regions of interest of the data frames. An explainable detection module connected to the machine-learned detection module. The explainable detection module uses the regions of interest of the data frames where objects have been detected to identify objects of interest using computer vision processing and outputs explained detected object data.

The sensors are cameras, RADAR, and/or LiDAR. A tracking module is connected to the explainable detection module and receives explained detected object data, storing the explained detected object data in memory and validating an explained detected object. A tracking supervision module is connected to the tracking module and receives validated explained detected object data. The tracking module compares the validated explained detected object data with expected object-of-interest data to identify detection failures.

A detection supervision module is connected to the machine-learned module and receives object detections from the machine-learned module and compares the object detection with expected object-of-interest data to identify detection failures.

A method of detecting a way-side object includes receiving a sensor data frames corresponding to a first time from sensors mounted on a vehicle and receiving position data corresponding to the first position of the vehicle at the first time. Object-of-interest data is retrieved from a database. The object-of-interest data corresponds to an expected object-of-interest detectable by the sensors at the first position of the vehicle. The sensor data frames and the object-of-interest data are processed to determine a region-of-interest in the sensor data frame. A portion of the sensor data frames corresponding to the region of interest are processed using machine-learned object detection to identify a first object-of-interest. The portion of the sensor data frames corresponding to the region of interest is processed using computer vision methods to detect features of the expected object-of-interest and identify the detected object-of-interest as explained when the features of the expected object-of-interest are detected. Sensor data frames corresponding to a series of times are processed to generate a series of explained object-of-interest data. An object detection is validated using the series of explained object-of-interest data. Explained object-of-interest data corresponding to the validated object detection are output to a navigation system of the vehicle.

The validated object detections are processed with expected object-of-interest data to identify object detection failures. The sensors are calibrated based on the object detection failures. The machine-learned object detection are calibrated based on the object detection failures. The expected object-of-interest data correspond to a calibration object. The calibration is performed by modifying one or more of an aperture, a shutter speed or a focal length. The calibration is performed by modifying neural-network detection probability thresholds.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein.

A method of detecting a way-side object includes receiving sensor data frames corresponding to a first time from sensors mounted on a vehicle. Object-of-interest data is retrieved from a database. The object-of-interest data corresponds to an expected object-of-interest detectable by the sensors at a first position of the vehicle. The sensor data frames and the object-of-interest data are processed to determine a region-of-interest in at least one frame of the sensor data frames. A portion of the sensor data frames corresponding to the region of interest using machine-learned object detection is processed to identify a first object-of-interest. The portion of the sensor data frames corresponding to the region of interest is processed using computer vision methods to detect features of the expected object-of-interest and identify the detected object-of-interest as explained when the features of the expected object-of-interest are detected. The explained object-of-interest data corresponding to the explained detected object-of-interest is output to a navigation system of the vehicle. The region of interest determined for the at least one frame of the sensor data frames is the entire at least one frame. The expected object-of-interest and detected object-of-interest are compared to determine a failure rate and wherein the failure rate is used to identify a safety level.

Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of detecting a way-side object comprising:
receiving sensor data frames corresponding to a first time from sensors mounted on a vehicle;
receiving position data corresponding to a first position of the vehicle at the first time;
retrieving object-of-interest data from a database, wherein the object-of-interest data corresponds to an expected object-of-interest detectable by the sensors at the first position of the vehicle;
processing the sensor data frames and the object-of-interest data to determine a region-of-interest in at least one frame of the sensor data frames;
processing a portion of the sensor data frames corresponding to the region of interest using machine-learned object detection to identify a first object-of-interest;
processing the portion of the sensor data frames corresponding to the region of interest using computer vision methods to detect features of the expected object-of-interest and identifying the detected object-of-interest as explained when the features of the expected object-of-interest are detected; and
outputting explained object-of-interest data corresponding to the explained detected object-of-interest to a navigation system of the vehicle.

2. The method of claim 1, further comprising receiving and processing sensor data frames corresponding to a series of times to generate a series of explained object-of-interest data.

3. The method of claim 2, wherein the series of explained object-of-interest is compared to validate the explained object-of-interest.

4. The method of claim 1, wherein the machine-learned object detection is a deep convolutional neural network.

5. The method of claim 3, further comprising comparing the validated explained object-of-interest with expected object-of-interest data to identify detection failures.

6. An explained machine learning object detection system, comprising:
an input module connected to sensors and a data server, wherein the input module receives data frames from the sensors corresponding to a first time and wherein the input module receives data corresponding to the sensors position and objects-of-interest detectable from the sensors position;
a region-of-interest module connected to the input module, wherein the region-of-interest module determines, using object-of-interest data, regions-of-interest of the data frames;
a machine-learned object detection module connected to the region-of-interest module, wherein the machine-learned object detection module uses the regions-of-interest of the data frames to detect objects in the regions of interest of the data frames; and
an explainable detection module connected to the machine-learned detection module, wherein the explainable detection module uses the regions of interest of the data frames where objects have been detected to identify objects of interest using computer vision processing and outputting explained detected object data.

7. The system of claim 6, wherein the sensors are at least one of cameras, RADAR or LIDAR.

8. The system of claim 6, further comprising a tracking module, connected to the explainable detection module and receiving explained detected object data, storing the explained detected object data in memory and validating an explained detected object.

9. The system of claim 8, further comprising a tracking supervision module, connected to the tracking module and receiving validated explained detected object data, comparing the validated explained detected object data with expected object-of-interest data to identify detection failures.

10. The system of claim 6, further comprising a detection supervision module connected to the machine-learned module and receiving object detections from the machine-learned module and comparing the object detection with expected object-of-interest data to identify detection failures.

11. A method of detecting a way-side object comprising;
receiving a sensor data frames corresponding to a first time from sensors mounted on a vehicle,
receiving position data corresponding to the first position of the vehicle at the first time;
retrieving object-of-interest data from a database, wherein the object-of-interest data corresponds to an expected object-of-interest detectable by the sensors at the first position of the vehicle;
processing the sensor data frames and the object-of-interest data to determine a region-of-interest in the sensor data frame;
processing a portion of the sensor data frames corresponding to the region of interest using machine-learned object detection to identify a first object-of-interest;
processing the portion of the sensor data frames corresponding to the region of interest using computer vision methods to detect features of the expected object-of-interest and identifying the detected object-of-interest as explained when the features of the expected object-of-interest are detected;
processing sensor data frames corresponding to a series of times to generate a series of explained object-of-interest data;
validating an object detection using the series of explained object-of-interest data; and
outputting explained object-of-interest data corresponding to the validated object detection to a navigation system of the vehicle.

12. The method of claim 11, further comprising comparing the validated object detections with expected object-of-interest data to identify object detection failures.

13. The method of claim 12, further comprising calibrating the sensors based on the object detection failures.

14. The method of claim 12, further comprising calibrating the machine-learned object detection based on the object detection failures.

15. The method of claim 12, wherein the expected object-of-interest data corresponds to a calibration object.

16. The method of claim 13 wherein the calibrating is performed by modifying one or more of an aperture, a shutter speed or a focal length.

17. The method of claim 14 wherein the calibrating is performed by modifying neural-network detection probability thresholds.

18. A method of detecting a way-side object comprising;
receiving sensor data frames corresponding to a first time from sensors mounted on a vehicle;
retrieving object-of-interest data from a database, wherein the object-of-interest data corresponds to an expected object-of-interest detectable by the sensors at a first position of the vehicle;
processing the sensor data frames and the object-of-interest data to determine a region-of-interest in at least one frame of the sensor data frames;
processing a portion of the sensor data frames corresponding to the region of interest using machine-learned object detection to identify a first object-of-interest;
processing the portion of the sensor data frames corresponding to the region of interest using computer vision methods to detect features of the expected object-of-interest and identifying the detected object-of-interest as explained when the features of the expected object-of-interest are detected; and
outputting explained object-of-interest data corresponding to the explained detected object-of-interest to a navigation system of the vehicle.

19. The method of detecting a way-side object of claim 18, wherein the region of interest determined for the at least one frame of the sensor data frames is the entirety of at least one frame.

20. The method of detecting a way-side object of claim 18, further comprising comparing the expected object-of-interest and detected object-of-interest to determine a failure rate and wherein the failure rate is used to identify a safety level.

* * * * *